United States Patent
Smith

(10) Patent No.: US 6,417,443 B1
(45) Date of Patent: Jul. 9, 2002

(54) EXHAUST CHAMBER FOR ARC RESISTANT CABINETS

(75) Inventor: James E. Smith, Bethel Park, PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/821,569

(22) Filed: Mar. 29, 2001

(51) Int. Cl.[7] ................................ H05K 7/20
(52) U.S. Cl. ................ 174/17 VA; 174/50; 484/184; 361/676
(58) Field of Search .................. 174/50, 17 VA, 174/17 R, 58, 16.1; 361/676, 600, 605, 606, 607, 608; 218/157; 220/3.2, 3.5; 454/184

(56) References Cited

U.S. PATENT DOCUMENTS

| | | | | |
|---|---|---|---|---|
| 2,258,150 A | * | 10/1941 | Scott, Jr. ................ | 361/606 |
| 4,153,044 A | * | 5/1979 | Nett ........................ | 126/99 |
| 4,484,513 A | * | 11/1984 | Napadow ................ | 98/115 SB |
| 4,484,563 A | * | 11/1984 | Fritz et al. .............. | 126/299 D |
| 5,574,624 A | | 11/1996 | Rennie et al. | |
| 5,689,097 A | | 11/1997 | Aufermann et al. | |
| 5,710,402 A | * | 1/1998 | Karnbach et al. ........ | 361/676 |
| 5,767,440 A | * | 6/1998 | Byron et al. ............ | 174/17 VA |
| 5,773,755 A | * | 6/1998 | Iwatare .................. | 174/17 VA |
| 5,878,905 A | * | 3/1999 | Gronbach et al. ...... | 174/17 VA |
| 6,067,223 A | * | 5/2000 | Diebel et al. ............ | 174/16.1 |

* cited by examiner

Primary Examiner—Dean A. Reichard
Assistant Examiner—Angel R. Estrada
(74) Attorney, Agent, or Firm—Martin J. Moran

(57) ABSTRACT

An exhaust chamber for an arc resistant cabinet directs high temperature, expanding gases away from locations where personnel are likely to be present. The exhaust chamber may have an open top, directing gases outward through the center of the exhaust chamber's top. Alternatively, the exhaust chamber may be completely enclosed, directing expanding gases through a duct.

8 Claims, 4 Drawing Sheets

EXHAUST CHAMBER FOR ARC RESISTANT CABINETS

BACKGROUND OF THE INVENTION

1. Field of the Invention

The present invention relates to arc resistant cabinets for electrical equipment. More specifically, the invention relates to an exhaust chamber for such a cabinet, adapted to channel high temperature expanding gases away from personnel.

2. Description of the Related Art

Electrical equipment such as circuit breakers are typically contained within arc electrically grounded resistant cabinets, intended to provide isolation for the components therein, and to protect personnel working around the circuit breaker from electrocution and from hot gases in the event of an electrical arc within the cabinet. Such an electrical arc would cause a sudden pressure increase inside the cabinet and localized overheating.

Presently available arc resistant cabinets typically include a frame having a hinged flap assembly. Such flaps are designed to support the weight of personnel working on top of the cabinet, but to open to relieve pressure inside the cabinet when an arc occurs. However, such gases may be deflected off the ceiling and wall of the room wherein the cabinet is located, down on to personnel working near the cabinet. Current and proposed safety standards require that the temperature of such gases be tested by placing highly flammable cotton indicators at a height of 2 meters around the perimeter of the cabinet, and these cotton indicators must not ignite when an internal arc occurs.

Accordingly, there is a need for an arc resistant cabinet having a means for directing high temperature, expanding gases exiting the cabinet away from locations where personnel are likely to be present. Additionally, there is a need for an arc resistant cabinet having a means for relieving pressure from high temperature, expanding gases while being easier and less expensive to produce than other arc resistant cabinets.

SUMMARY OF THE INVENTION

The preferred embodiments of the present invention are exhaust chambers for use with arc resistant cabinets. Such exhaust chambers are particularly useful for arc resistant cabinets containing electrical equipment, such as circuit breakers.

The exhaust chamber will preferably be located at the top of the arc resistant cabinet. A typical arc resistant cabinet includes a plurality of hinged flaps on the roof, thereby permitting high pressure, high temperature gases caused by an electrical arc inside the cabinet to exit the cabinet by pushing open these hinged flaps. The exhaust chamber includes a plurality of vertical walls surrounding that portion of the roof having these hinged flaps. One embodiment of the exhaust chamber includes horizontal shelves extending inward from the top of the vertical walls, thereby defining an opening in the center of the exhaust chamber's top. An alternative embodiment includes a top extending across the entire exhaust channel, thereby completely enclosing the channel. In this second embodiment, a duct is connected to the exhaust chamber, leading away from areas where personnel are likely to be present. This duct could be extended in any direction, for example, vertically, to either side, to the front, or to the rear.

During normal operation of the electrical equipment within the cabinet, the hinged roof flaps will remain closed. If an electrical arc occurs, the high temperature, expanding gases apply upward pressure to the hinged flaps, thereby pushing the flaps upward. As the gases enter the exhaust chamber, they will have room to expand, thereby reducing their pressure. The gases will also have additional time to cool before exiting the chamber. If an open top expansion chamber is selected, the expanding gases will be directed by the vertical walls and horizontal shelves towards the center of the expansion chamber, where they will exit through the top of the chamber. If the enclosed expansion chamber is selected, the gases will expand into the chamber, and then continue expanding to enter the duct. Both embodiments will reduce the pressure of the gas, and permit sufficient time for cooling, to ensure the safety of personnel working around the cabinet.

It is therefore an aspect of the present invention to provide an expansion chamber for use with arc resistant cabinets.

It is another aspect of the present invention to provide an expansion chamber directing high temperature, expanding gases towards an opening in the chamber's top, thereby providing sufficient time for cooling before these gases reach personnel.

It is a further aspect of the present invention to provide an enclosed expansion chamber, for directing high temperature, expanding gases into a duct.

These and other aspects of the present invention will become apparent through the following description and drawings.

BRIEF DESCRIPTION OF THE DRAWINGS

Like reference numbers denote like elements throughout the drawings.

DETAILED DESCRIPTION OF THE PREFERRED EMBODIMENTS

Preferred embodiments of the present invention are exhaust chambers. Such exhaust chambers are particularly useful for arc resistant cabinets for electrical equipment, such as those used to contain circuit breakers.

Figure 3:
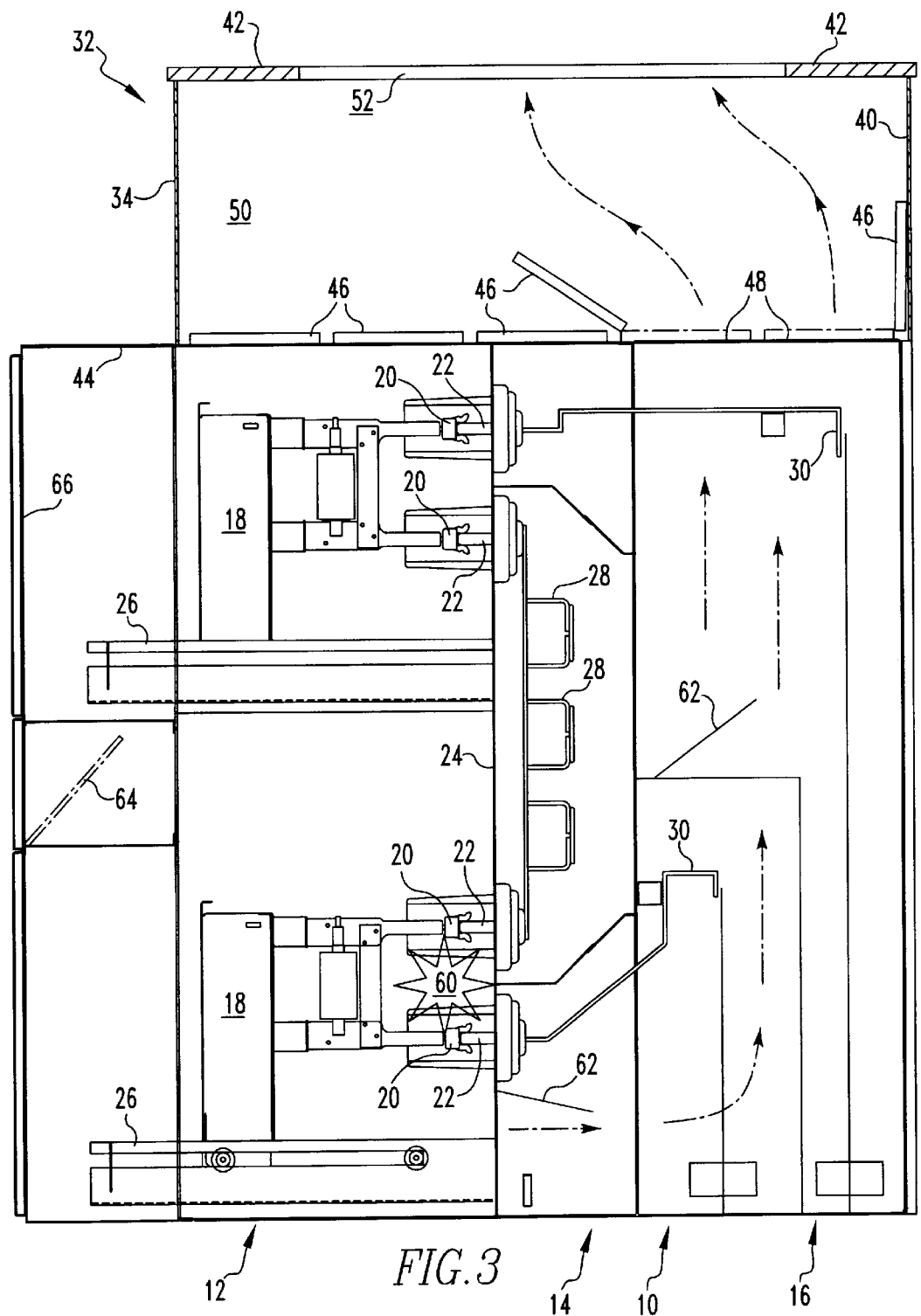
FIG. 3 is a cross-sectional side view of an arc resistant cabinet having an exhaust chamber of the present invention.
Figure 4:
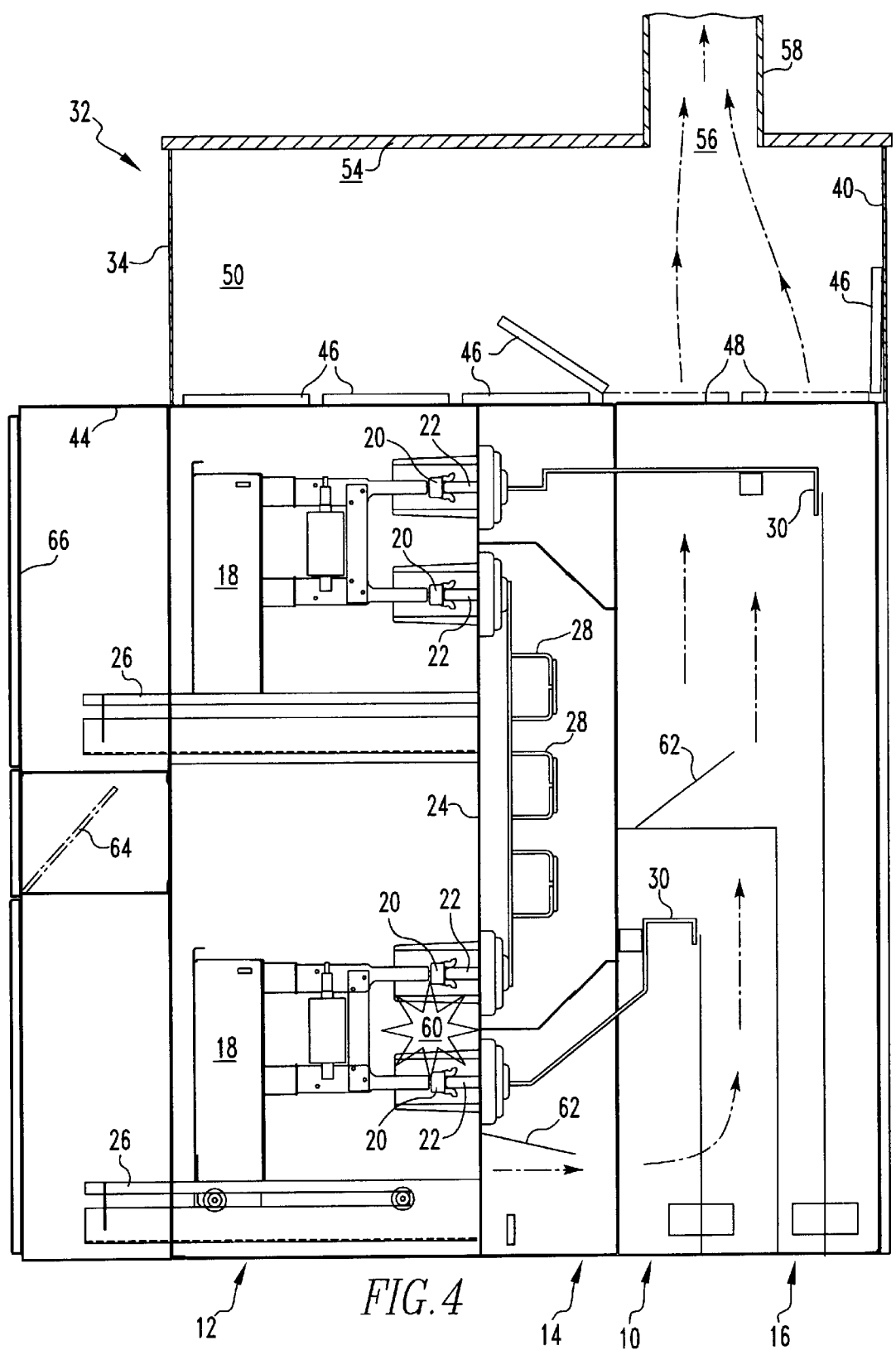
FIG. 4 is a cross-sectional side view of an arc resistant cabinet having an alternative embodiment of an exhaust chamber according to the present invention.

An exhaust chamber of the present invention is best understood through an explanation of a conventional arc resistant cabinet, typically used for a medium voltage circuit breaker. Referring to the figures, an arc resistant cabinet 10 is illustrated. The arc resistant cabinet 10 includes a front compartment 12, a middle compartment 14, and a rear compartment 16. Referring to FIGS. 3–4, the front compartment 12 contains at least one circuit breaker 18. It is well known that the circuit breaker 18 will typically include at least one pair of quick disconnects 20, mating with at least one pair of corresponding stabs 22, located within the front compartment rear wall 24. A levering in assembly 26 permits moving the circuit breaker 18 forward and rearward to connect the quick disconnects 20 and stabs 22 when operation of the circuit breaker is desired, and disconnects the quick disconnects 20 and stabs 22 when servicing the circuit breaker 18 is desired. The middle compartment 14 typically contains the supply buses 28. The rear compartment 16 typically contains the cable connections 30.

The top 44 of the arc resistant cabinet 10 includes a plurality of flaps 46, dimensioned and configured to cover the openings 48 in the top 44 during normal operation of the circuit breakers 18, and to be pushed open by excessive pressure within the cabinet 10. A typical flap 46 will be hingedly secured to a frame surrounding the openings 48 (not shown and well known). The frame will prevent the flap 46 from collapsing if someone walking on top of the cabinet 10 should step on the flap 46, but permit the flap to be pushed open by pressure from inside the cabinet 10. The cabinet 10 also includes internal pressure relief panels 62 and ventilation flap 64. The internal pressure relief panels 62 are weakened, thereby permitting them to fail before other components within the cabinet 10 fail.

If arcing should occur inside the cabinet 10, the result is a sudden pressure increase and overheating. Materials exposed to the arc may produce hot gases or particles, which must be discharged to the outside of the cabinet 10 to avoid extensive internal damage, but in a manner not likely to injure personnel working around the cabinet 10.

Figure 1:
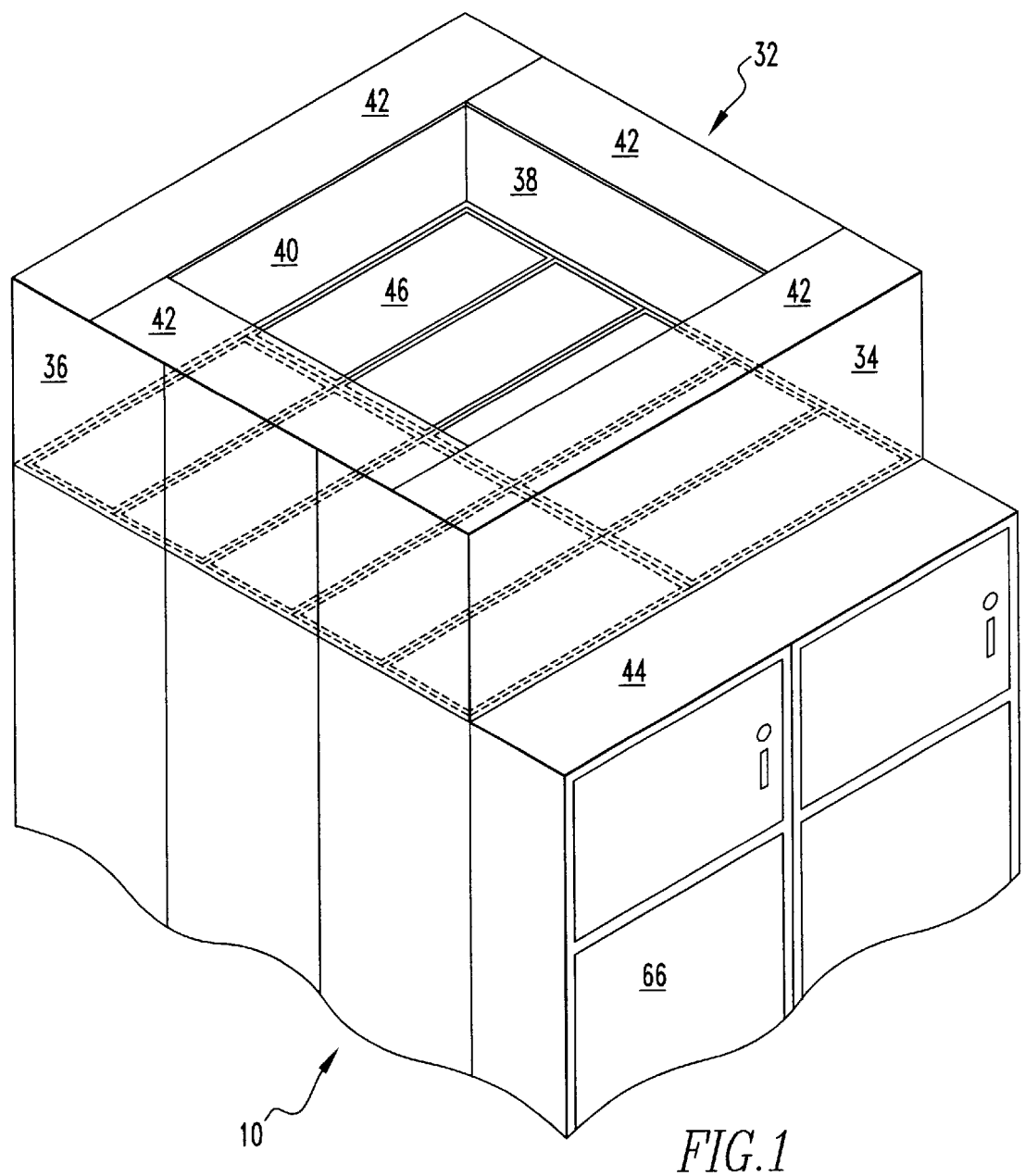
FIG. 1 is an isometric top view of an arc resistant cabinet having an exhaust chamber of the present invention, illustrating the exhaust flaps on the cabinet in their closed position.
Figure 2:
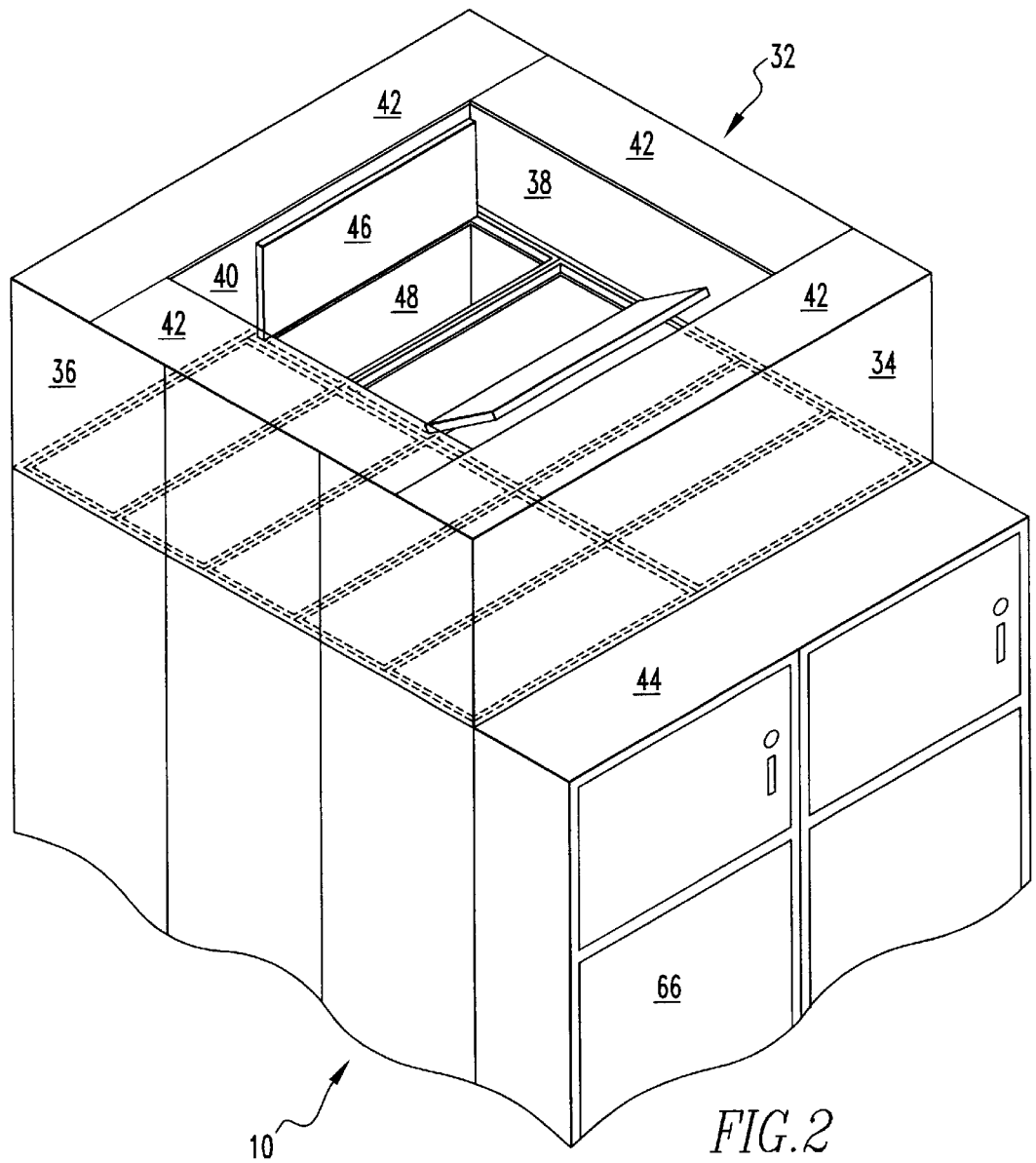
FIG. 2 is an isometric top view of an arc resistant cabinet having an exhaust chamber of the present invention, illustrating the exhaust flaps on the cabinet in their open position.

Referring to FIGS. 1–3, an exhaust chamber 32 is illustrated. The exhaust chamber 32 includes a plurality of sides 34, 36, 38, 40, and a top 42. The sides 34, 36, 38, and 40 are fixed to the top 44 of the cabinet 10. The exhaust chamber 32 defines a chamber 50, within the sides 34, 36, 38, 40, and under the top 42. The chamber 50 contains the flaps 46. An opening 52, defined within the exhaust chamber 32, is in communication with the chamber 50, so that the chamber and opening are dimensioned and configured to permit high temperature, high pressure gases to expand and cool, and direct the gases in a safe direction.

Alternatively, as illustrated in FIG. 4, the exhaust chamber 32 may include a top 54, having an opening 56, dimensioned and configured to adjoin a duct 58. Although the illustrated example of a duct 58 adjoins the top 54, the duct may alternatively adjoin any of the sides 34,36,38,40.

During normal operation of the circuit breakers 18, the flaps 46 will be in their closed position, illustrated in FIG. 1. In the event of an electrical arc 60, which is most likely to occur in the front compartment 12, the flaps 46 will operate in conjunction with internal pressure relief panels 62 and ventilation flap 64 to direct the resulting high temperature, expanding gases away from locations where personnel are likely to be present. The expanding gases push the ventilation flap 64 closed, ensuring that none of the expanding gases exit through the front 66 of the cabinet 10, where personnel are likely to be located. At the same time, the expanding gases push the internal pressure relief panels 62 open, permitting the expanding gases to reach the top 44 of the cabinet 10. The expanding gases then push the flaps 46 open, illustrated in FIGS. 2–4. As the expanding gas exits the cabinet 10, it enters the exhaust chamber 32, wherein it continues to expand. Depending on the embodiments of the exhaust chamber 32 selected, the expanding gases then exit through the opening 52, or the duct 56. This additional upward travel of the expanding gas as it passes through the exhaust chamber 32 provides additional time for the gas to cool before reaching areas where personnel are likely to be present, thereby minimizing the potential for serious injuries.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An exhaust chamber for an arc-resistant cabinet, the arc-resistant cabinet including a roof and a plurality of external exhaust flaps defined within the roof, said exhaust chamber comprising:

a plurality of walls, dimensioned and configured to be secured to the roof of the arc-resistant cabinet, and to enclose the exhaust flaps;

a top, a chamber defined between said walls and top;

an opening in communication with said chamber;

said chamber and said opening being dimensioned and configured to permit high-temperature, high pressure gases to expand and cool, and to direct the gases in a safe direction after the gases have exited the cabinet through the exhaust flaps.

2. The exhaust chamber according to claim 1, wherein said opening is defined within said top.

3. The exhaust chamber according to claim 2, wherein said opening is located substantially in a center of said top.

4. The exhaust chamber according to claim 1, wherein said opening is dimensioned and configured to adjoin a duct.

5. An arc-resistant cabinet, comprising:

a roof;

a plurality of external exhaust flaps defined within the roof, and dimensioned and configured to open in response to pressure applied to said exhaust flap from inside said arc-resistant cabinet;

an exhaust chamber, comprising:

a plurality of walls, dimensioned and configured to be secured to the roof of the arc-resistant cabinet, and to enclose said exhaust flaps;

a top, a chamber defined between said walls and top;

an opening in communication with said chamber;

said chamber and said opening being dimensioned and configured to permit high-temperature, high pressure gases to expand and cool, and to direct the gases in a safe direction after the gases have exited the cabinet through the exhaust flaps.

6. The arc-resistant cabinet according to claim 5, wherein said opening is defined within said top.

7. The arc-resistant cabinet according to claim 6, wherein said opening is located substantially in a center of said top.

8. The arc-resistant cabinet according to claim 5, wherein said opening is dimensioned and configured to adjoin a duct.

* * * * *